United States Patent [19]

Schartz

[11] Patent Number: 4,481,756
[45] Date of Patent: Nov. 13, 1984

[54] COMBINE HARVESTER

[76] Inventor: Charles O. Schartz, R.R. #2, Box 76, Larned, Kans. 67550

[21] Appl. No.: 513,822

[22] Filed: Jul. 15, 1983

[51] Int. Cl.$^3$ ............................................. A01D 41/12
[52] U.S. Cl. ................................ 56/10.2; 56/DIG. 15
[58] Field of Search ......................... 56/10.2, DIG. 15

[56] References Cited

U.S. PATENT DOCUMENTS 3,638,659  2/1972  Dahlquist et al. ............ 56/DIG. 15
3,935,866  2/1976  Northrup et al. ............ 56/DIG. 15

FOREIGN PATENT DOCUMENTS 597277  5/1960  Canada ................................. 56/10.2
2098446  11/1982  United Kingdom ................. 56/10.2

Primary Examiner—Paul J. Hirsch
Attorney, Agent, or Firm—E. Robert Newman

[57] ABSTRACT

A combine harvester having a tube type sensor the full width of its chaffer sieve for detecting grain loss through the vertical area between the tail end thereof and the underside of the straw walker, comprises a carrier to which the sensor is mounted and structure providing for manual positioning thereof by the harvester operator within said area at will. In another embodiment a stationary tube sensor is mounted somewhat above the chaffer sieve tail end to also indicate the effect of excessive fan speed on grain loss.

4 Claims, 3 Drawing Figures

COMBINE HARVESTER

FIELD OF THE INVENTION

The present invention relates generally to combine harvesters which utilize one or more of various types of sensing devices to transmit output signals, usually in the form of electrical impulses, for the purpose of supplying information which may be used directly or indirectly to improve or control one or more functions of a combine harvester. More particularly, the invention relates to the utilization of sensors to detect grain loss over the tail end of the chaffer sieve of the combine harvester.

BACKGROUND ART

In combination, the chaffer sieve and cleaning fan of a combine make up a cleaning or fanning mill for separating chaff from grain. The steady flow of cleaning air supplied by the fan is intended to blow through the chaffer sieve and carry the lighter chaff off of the sieve and out the back of the combine, allowing the heavier grain to fall through onto the cleaning sieve. When this fanning mill does not perform as intended, chaff and grain will be carried along with the chaff over the tail end of the chaffer. Since the chaffer sieve and fan combination do not represent a screening operation, but rather a fanning mill, usually the solution to its malfunction has been to increase fan speed. Thus, sensing devices have been located in the immediate adjacency of the tail end of the chaffer sieve. When too much grain strikes the sensor, fan speed is increased.

While it is important to detect grain which is carried over the rear of the sieve due to slow fan speed, the other side of the coin is the effect of too much fan speed. When too much air is applied to the chaffer sieve, grain and chaff are blown back and over a sensor which is located adjacent to the tail end of the chaffer sieve.

The inventor is aware of sensing devices of various types being located at innumerable positions throughout the combine harvester. See for example U.S. Pat. No. 3,939,846 to Drozhzhin et al which locates a sensor under the sieve of the cleaner, U.S. Pat. No. 4,036,065 to Strelioff et al which locates sensors across the rear of the sieve and at the rear portion of the straw walker, U.S. Pat. No. 4,259,829 to Strubbe in which sensors are located on the louvres of the chaffer sieve, and U.S. Pat. No. 4,360,998 to Somes which provides a matrix of sensors disclosed about the cleaning sieve (which is below the chaffer sieve). While these and other sensor locations serve to provide information useful in improving many aspects of combine operation, the inventor is unaware of any prior art sensors which are located to detect grain loss above the tail end of the chaffer sieve caused by too much air from the fan.

DISCLOSURE OF THE INVENTION

When too much fan speed lifts grain off of the chaffer sieve before it falls through or reaches the tail end, that grain will follow an inverted elliptical path which will begin somewhere above the chaffer sieve and below the underside of the straw walker and end on the ground somewhere behind the combine. Thus, there is a generally inverted cornucopial-shaped zone beginning at the vertical plane between the tail end of the chaffer sieve and the underside of the straw walker and ending in a generally larger area along the ground immediately behind the combine through which such grain may travel. A sensor stationed anywhere within this zone would detect the effect on grain of excessive fan speed. The best place to locate such a sensor is intermediate the top of the tail end of the chaffer sieve and the underside of the straw walker. In one embodiment of my invention, a sensor of the tube type which extends the full width of the chaffer sieve is so located.

In the preferred embodiment of my invention, a tube sensor is movable between a point behind and below the tail end of the chaffer sieve and a point thereabove immediately below the underside of the straw walker. In this embodiment, mechanism is provided for the combine operator to control the exact position of the sensor at will. Thus, at his option, he may set the fan speed for optimum efficiency. Although not disclosed herein, variations of my invention involving higher degrees of automation are possible. One such variation would be the addition of mechanism to continually oscillate the sensor between extreme positions in order to provide a warning signal or other well known electronic output information. Another variation would be to have the oscillating sensor directly control fan speed or other functions through pre-programming provisions.

An object of this invention is to provide an improved combine harvester.

Another object is to provide an improved fanning mill operation.

A further object of the invention is to reduce grain loss from the chaffer sieve resulting from excessive fan speed.

Still another object is to provide a simple mechanism with which the combine operator may monitor grain loss from the chaffer sieve resulting from either too high or too low fan speed.

These and other objects, advantages, and novel features of the present invention will become apparent from the following detailed description when considered in conjunction with the accompanying drawings.

BEST MODE FOR CARRYING OUT THE INVENTION

Figure 1:
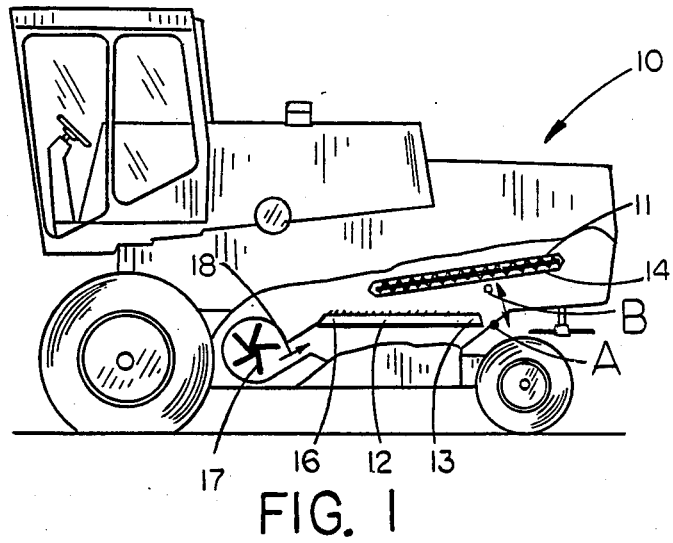
FIG. 1 is a side elevation view partly in section, showing the present invention with one position of a sensor indicated in phantom lines.

Referring now to the drawings, wherein like reference numerals designate identical or corresponding parts throughout the several views, and more particularly to FIG. 1, whereon the combine harvester is designated generally at (10), and the significant elements pertinent to it may be seen. Two of these elements are the straw walker (11) and the chaffer sieve (12). It would be conventional to fixedly locate a sensor adjacent to the tail end (13) of chaffer sieve (12), such as at point A, in order to detect grain carried away with chaff as a result of slow fan speed. As will be explained hereinafter, the present invention includes mechanism for controlledly moving a sensor from point A to a point immediately adjacent to the underside (14) of straw walker (11), such as point B, in order to detect the ill-effects of both too slow or too fast fan speed.

Continuing to refer to FIG. 1, grain and tailings received at the front end (16) of chaffer sieve (12) are moved rearwardly along chaffer sieve (12) by fore-and-aft reciprocation thereof, in a conventional manner. As also is conventional, cleaning fan (17) assists in moving the grain and tailings rearwardly by blowing upwardly and rearwardly in the direction of arrow (18) through chaffer sieve (12). Ideally all clean grain will drop through chaffer sieve (12) somewhere along its length and all tailings will be carried between the tail end (13) of chaffer sieve (12) and the underside (14) of straw walker (11) out the back of combine harvester (10) to fall on the ground. It is the primary object of this invention to detect the presence and location of any grain which passes beyond the tail end of the chaffer sieve for any reason.

Figure 2:
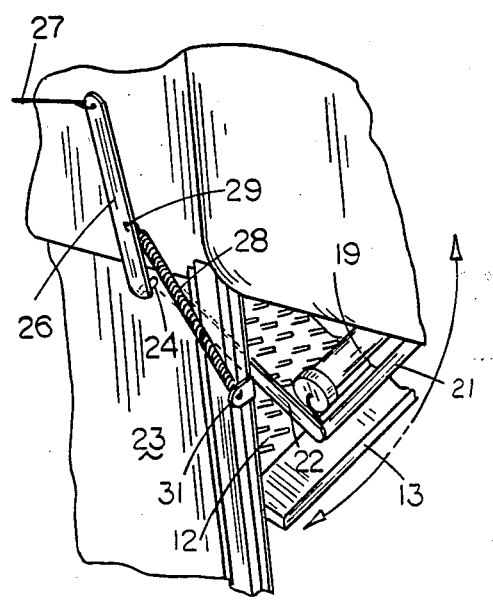
FIG. 2 is a fragmentary perspective view of the preferred embodiment of the present invention.

Referring now to FIG. 2, a sensor (19) of the tube type is shown mounted on carrier (21). Sensor (19) has a length equal to the full width of the chaffer sieve in the preferred embodiment; however, less costly sensors, smaller in size, may be strategically located anywhere between the tail end of the chaffer sieve and the underside of the straw walker in order to indicate the presence of grain loss in this area. Carrier (21) is supported between an arm (22) which is pivotally journalled to a wall (23) of combine harvester (10) on one side thereof and an arm which is similarly and symmetrically journalled on the other side thereof and which is not shown. The location of pivot point (24) and the length of arm (22) is such that sensor (19) may be moved to and between points A and B (see FIG. 1).

Lever (26) is affixed directly or indirectly to arm (22) near the point at which arm (22) is journalled to wall (23), and flexible line (27) is affixed to the free end of lever (26). The free end of line (27) is then supported in a conventional manner along the wall of combine harvester (10) and through an opening therein at some convenient point in order to be available in the operator's cabin for his manual manipulation thereof.

It should be obvious that sensor (19) can be moved between point A and point B by the manipulation of the end of lever (26) which is attached to line (27). However because line (27) is flexible, it can only move tube (19) in one direction. To return tube (19) in the other direction, spring (28) is connected between an intermediate point (29) on lever (26) and an appropriately located support member (31) attached to the wall of the combine harvester (10). Accordingly, structure is provided for the operator of combine harvester (10) to determine the presence and location of grain not falling through chaffer sieve (12) and being lost in the area above its tail end (13) and the underside (14) of the straw walker (11).

Figure 3:
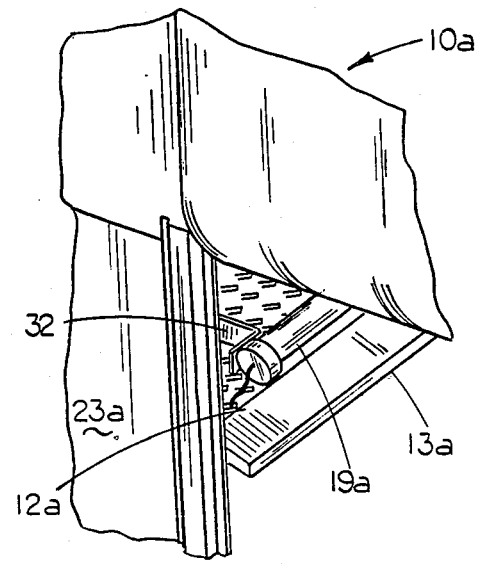
FIG. 3 is a fragmentary perspective view of an alternate embodiment of the present invention.

In an alternate embodiment of the present invention, as seen in FIG. 3, tube-type sensor (19a) is located at a point intermediate the tail end (13a) of grain chaffer sieve (12a) and the underside of the straw walker (not shown). In this embodiment tube sensor (19a) is supported at a fixed point by bracket (32) attached to wall (23a) on one side of combine harvester (10a) and by a similarly and symmetrically attached bracket on the other side (not shown). This embodiment would be useful in producing an output signal whenever the fan speed is such that grain is passing beyond the tail end (13a) of chaffer sieve (12a) at an elevation not detectable by detectors located immediately adjacent to the tail end (13a).

Accordingly, it is believed that all the objects mentioned above are accomplished by use of the two modes for carrying out the invention disclosed herein. Obviously, many modifications and variations of the present invention are possible in light of the above teachings. It is therefore to be understood that, within the scope of the appended claims, the invention may be practiced otherwise and as specifically described.

I claim:

1. A combine harvester of the type having a mobile chassis on which is mounted means for harvesting, threshing, separating and cleaning grain, said cleaning means including a chaffer sieve for the passage therethrough of clean grain in a first direction and a fan for operably blowing a cleaning air stream therethrough in a second direction, the improvement comprising means for sensing the presence of grain and producing a corresponding output signal, said sensing means being mounted on a carrier operably movable between a first location at the upper extremity of the vertical zone above the tail end of the chaffer sieve where grain might be carried by excessive fan power and a second location adjacent to the tail end of the chaffer sieve, and means for utilizing said output signal in order to reduce the quantity of grain between said locations.

2. The combine harvester as described in claim 1, further comprising an arm which, at a point thereof mediate its ends, is pivotally attached to said chassis and which supports said sensing means on a first end; and means for controllably moving the second end of said arm.

3. The combine harvester as described in claim 2, wherein the moving means includes a flexible line attached to said second end and leading to the combine cabin for manual manipulation in a first direction and a means for biasing said second end in the opposing direction.

4. The combine harvester as described in claim 3, further comprising means for supporting said line along the chassis and means for holding its free end at a convenient location for manual manipulation.

* * * * *